(12) United States Patent
Wang

(10) Patent No.: US 7,513,693 B2
(45) Date of Patent: Apr. 7, 2009

(54) FIBER OPTIC CONNECTOR RELEASE MECHANISM

(75) Inventor: Dong-Yang Wang, Dasi Township, Taoyuan County (TW)

(73) Assignee: Liverage Technology Inc., Hsinchu (TW)

( * ) Notice: Subject to any disclaimer, the term of this patent is extended or adjusted under 35 U.S.C. 154(b) by 0 days.

(21) Appl. No.: 11/907,143

(22) Filed: Oct. 10, 2007

(65) Prior Publication Data

US 2008/0089649 A1 Apr. 17, 2008

(30) Foreign Application Priority Data

Oct. 11, 2006 (TW) .............................. 95217920 U

(51) Int. Cl.
*G02B 6/36* (2006.01)
*G02B 6/42* (2006.01)

(52) U.S. Cl. .............................. 385/56; 385/92; 385/89
(58) Field of Classification Search ........................ None
See application file for complete search history.

(56) References Cited

U.S. PATENT DOCUMENTS

| | | | |
|---|---|---|---|
| 6,824,416 B2* | 11/2004 | Di Mascio ................. 439/352 |
| 6,872,010 B1* | 3/2005 | Bianchini ..................... 385/92 |
| 6,884,097 B2* | 4/2005 | Ice ............................. 439/160 |
| 6,908,323 B2* | 6/2005 | Ice ............................. 439/160 |
| 6,991,481 B1* | 1/2006 | Guan et al. ................. 439/160 |
| 7,090,523 B2* | 8/2006 | Shirk et al. ................. 439/352 |
| 7,201,520 B2* | 4/2007 | Mizue et al. .................. 385/92 |
| 7,322,753 B2* | 1/2008 | Mizue et al. .................. 385/92 |
| 2006/0118942 A1* | 6/2006 | Schmidt ..................... 257/700 |

* cited by examiner

*Primary Examiner*—Omar Rojas
(74) *Attorney, Agent, or Firm*—Guice Patents PLLC

(57) ABSTRACT

A fiber optical connector release mechanism is disclosed. The fiber optical connector is incorporated in a cage assembly through a transceiver module. The front end of the transceiver module is disposed with a handle and a bail which is rotated to operate the release mechanism such that a pair of guiding tenons disposed at the inner wall are urged to push a pair of longitudinal guiding slots at the front end of the handle during the rotation process to move two rearward extending arms of the handle forward and in turn render wedge elements at its rear end disengaged from the snap engagement of the lock tabs due to the forward motion of the arms. Further, the locating structure of the arms and their corresponding slide paths is released from the locked state such that the transceiver module may be pulled out of the cage assembly.

4 Claims, 11 Drawing Sheets

FIBER OPTIC CONNECTOR RELEASE MECHANISM

FIELD OF THE INVENTION

The present invention relates to a fiber optical connector and in particular to a fiber optical connector release mechanism which is operated to release and thus remove a transceiver module from the locked state with a cage assembly.

BACKGROUND OF THE INVENTION

Computers and peripheral equipments as well as satellite and communication systems have involved rapidly in recent years. The data transmission rate of these systems has to be increased to control the systems and thus to execute highly sophisticated tasks, such as digital signal processing, imaging analysis, communication, and so on. For the present demand, the optical coupler is used in computers with short and long distances; moreover, several chips are integrated into a single printed circuit board (PCB). Also, high-speed signaling used in the electronic interconnection has been shown to enhance the data transmission rate.

To meet such a demand, some companies have a pair of LC plugs installed in a pair of bays and then securingly mounted on a PCB, which is further installed in the housing of a transceiver module such that the transceiver module may be inserted into or removed from the cage assembly of a mother board to know whether the transceiver module is in use.

U.S. Pat. No. 6,872,010 B1 discloses a fiber optical connector release mechanism, comprising a rotatable bail and a sliding handle. The handle comprises a pair of protruding arms whose ends have a wedge element, respectively, so as to be accommodated in the slide path formed on the corresponding sidewalls of the cage assembly. Further, the two sidewalls near the opening of the cage assembly are bended inward to form a locking tab, respectively, to retain the wedge elements. When the bail is being rotated, the handle is driven forward such that the wedge element is flexibly compressed to disengage from the locking tab and is thus released from the locked state. Consequently, the transceiver module is free to slide out of the cage assembly.

The first feature of the patent described above is that the relative motion of the handle and the bail occurs at an eccentric cam slot longitudinally formed at the sidewalls and a straight second slot transversally formed at the bottom of the handle; further, the first axis pin and the second axis pin of the bail are received, respectively, in the eccentric cam slot and the straight second slot, such that when the bail is being rotated, the slots and axis pins of the handle move with respect to each other and in turn transversally move forward to be released from snap engagement.

Further, the second feature lies in the fact that the bail has a protruding tab to define a slot which in turn receives a boss protruding from the sidewall of the handle, such that when the bail is in the locked position, the slot and the boss form a snap engagement to locate the bail.

SUMMARY OF THE INVENTION

In view of the foregoing shortcomings of the prior art, the inventor of the present invention based on years of experience in the related industry to conduct extensive researches and experiments, and finally invented a fiber optical connector release mechanism in accordance with the present invention.

The primary objective of the present invention is to provide a fiber optical connector release mechanism in combination with a transceiver module housed in a cage assembly, comprising: a transceiver module which is a housing disposed with relevant circuits and a pair of LC plugs mounted at the two front openings and whose two sidewalls are disposed with a slide path, respectively, which is protruded to form at least an engage protrusion; a handle whose bottom is connected through a connection plate to a pair of arms extending rearward which are formed to have engage slots corresponding to the engage protrusions, to have a pair of longitudinal guiding slots at the front end, and to have flexible wedge elements at the rear end, wherein the wedge elements are positioned at the protruded segments at the end of the slide paths; a bail whose two sidewalls are pivotally connected to the front of the two sidewalls of the housing and which is protrudingly disposed with a pair of guiding tenons to be received in their respective guiding slots; a cage assembly whose front is disposed with an opening and two sidewalls are disposed with a flexible locking tab corresponding to the wedge elements; such that, when at the locked state, the engage slot on the arm is retained at the engage protrusion at the slide path to render the bail at the locked position; and further, when the bail is rotated such that the guiding tenons drive the guiding slots to move the arms forward and the wedge elements and the engage slots released from the snap engagement of the locking tabs and engage protrusions due to the forward motion of the arms, such that the transceiver module is free to be pulled out of the cage assembly.

Another objective of the present invention is to provide a fiber optical connector release mechanism in combination with a transceiver module housed in a cage assembly, comprising: a transceiver module which is a housing disposed with relevant circuits and a pair of LC plugs mounted at the two front openings and whose two sidewalls are disposed with a slide path, respectively, which is recessively to form a retain slot at surface; a handle whose bottom is connected through a connection plate to a pair of arms extending rearward which are formed to have flexible tabs corresponding to the retain slots, to have a pair of longitudinal guiding slots at the front end, and to have flexible wedge elements at the rear end, wherein the wedge elements are positioned at the protruded segments at the end of the slide path; a bail whose two sidewalls are pivotally connected to the front of the two sidewalls of the housing and which is protrudingly disposed with a pair of guiding tenons to be received in their respective guiding slots; a cage assembly whose front is disposed with an opening and two sidewalls are disposed with a flexible locking tab corresponding to the wedge elements; such that, when at the locked state, the engage slot on the arm is retained at the engage protrusion at the slide path to render the bail at the locked position; and further, when the bail is rotated such that the guiding tenons drive the guiding slots to move the arms forward and the wedge elements and the flexible tabs released from the snap engagement of the locking tabs and the engage slots due to the forward motion of the arms, such that the transceiver module is free to be pulled out of the cage assembly.

A further objective of the present invention is to provide a fiber optical connector release mechanism, wherein the pivotal connection between the housing and the bail is achieved by inserting two axis pins into the corresponding axis holes on the bail and then onto the correspondingly formed pivotal holes at the front of the housing for fixed mounting.

Another further objective of the present invention is to provide a fiber optical connector release mechanism, wherein there are two engage protrusions and two engage slots, and when at the locked position, the two engage protrusions are retained with the two engage slots and when at the released position, the rear engage slot is engaged with the front engage protrusion.

A further objective of the present invention is to provide a fiber optical connector release mechanism, wherein the retain slot is a tapered face and when the movable end of the flexible tab, due to its flexibility, moves along the tapered face and is retained at the retain slot, such that the bail returns automatically to the locked position.

DETAILED DESCRIPTION OF THE PREFERRED EMBODIMENTS

Figure 1:
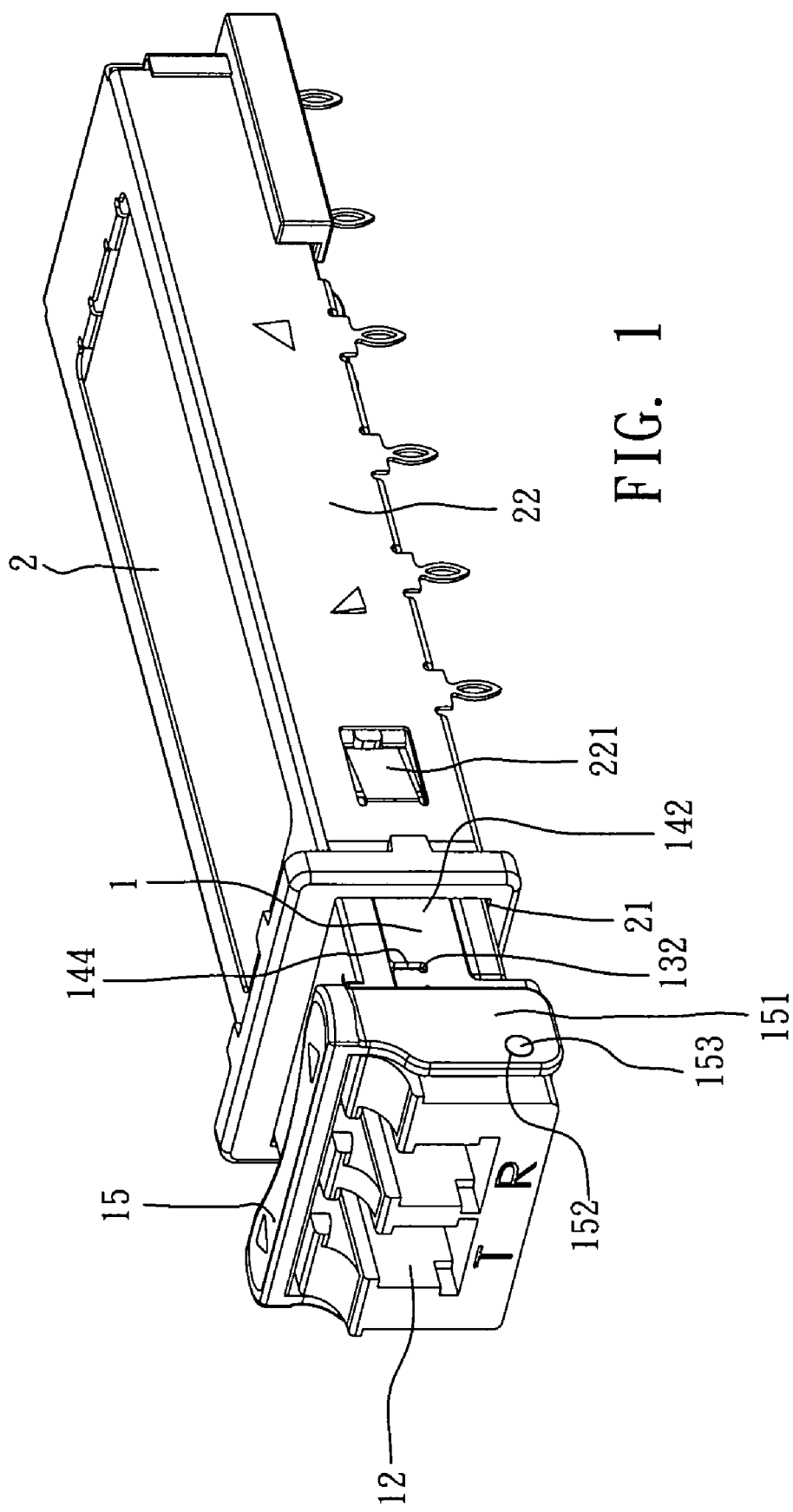
FIG. 1 is a perspective view of a fiber optical connector of the present invention.
Figure 2:
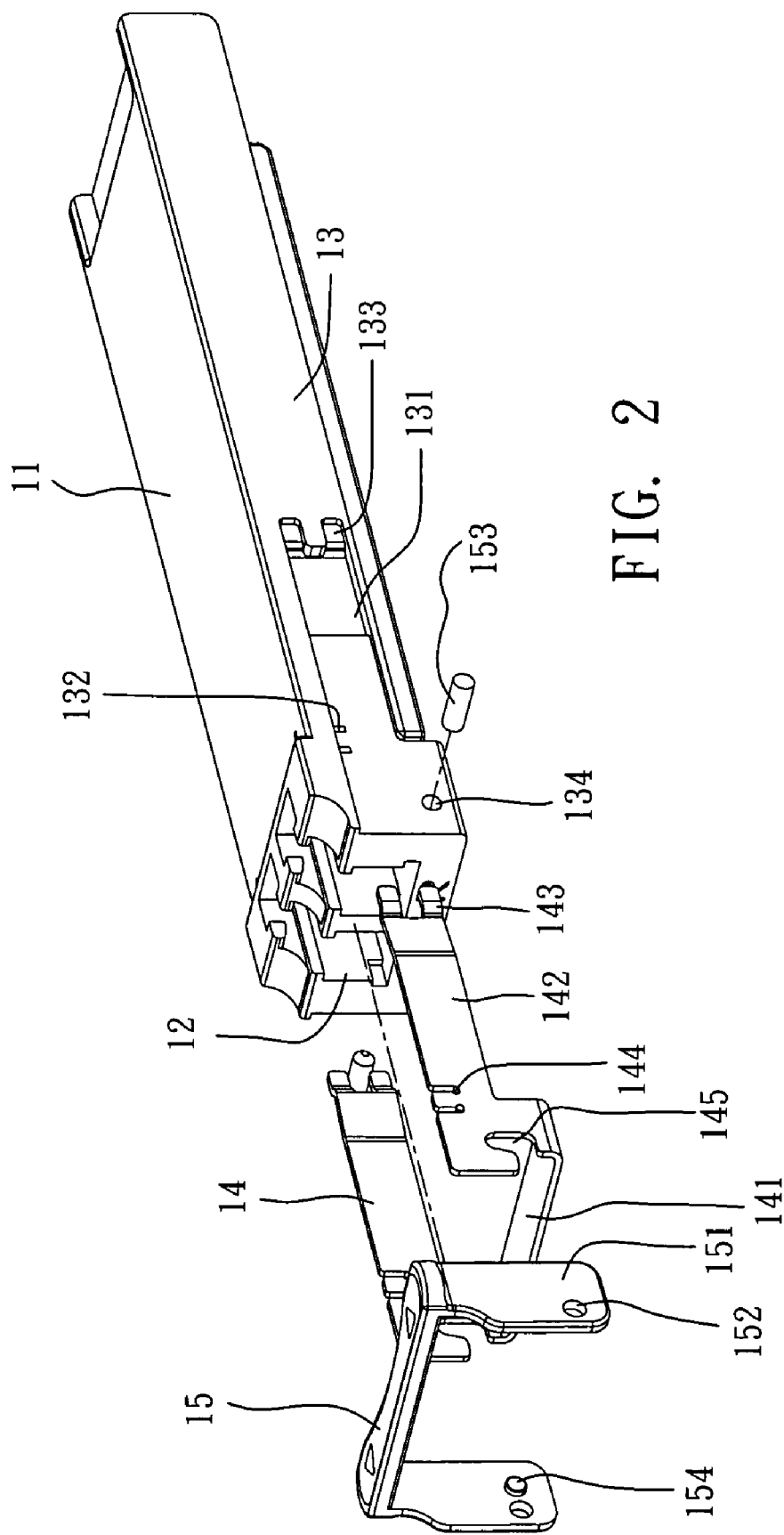
FIG. 2 is an exploded view of a transceiver module of the present invention.

The structure, technical measures and effects of the present invention will now be described in more detail hereinafter with reference to the accompanying drawings that show various embodiments of the invention.

With reference to FIGS. 1 to 6, a fiber optical connector release mechanism of the present invention comprises a transceiver module 1 and a cage assembly 2, wherein the transceiver module 1 is a housing 11 in which some relevant circuits and a pair of LC plugs 16 (please refer to FIG. 12) mounted at the two front openings 12, which is a conventional art and will not discussed here furthermore. The two sidewalls 13 of the housing 11 form a slide path 131, respectively, to receive the arm 142 (described later) for sliding thereon. The feature of the present invention is that the edge of the slide path 131 is protruded to form at least an engage protrusion 132 to provide the locating function when the slide path 131 and the arm 142 form a snap engagement.

The handle 14 is an U-shape frame, whose bottom is connected through a connection plate 141 to a pair of arms 142 extending rearward each of which is disposed at its rear end with a flexible wedge element 143, in a shape of fork for example, which is received at a fork-like protruded segment 133 at the end of the slide path 131 and retained with a locking tab 221 of the cage assembly 2 described later, such that the housing 11 is securingly mounted inside the cage assembly 2; alternatively, the wedge element 143 is flexibly compressed, through the forward motion of the arm 142, to be released from retaining with the locking tab 221, such that the transceiver module 1 is free to be pulled out from the opening 21 at the front of the cage assembly 2. The arms 142 are formed to have at least an engage slot 144 corresponding to at least an engage protrusion 132 so as to enable the bail 15 retained with the arm 14 and thus form a locating relation between them. Further, the front ends of the two arms 142 are correspondingly disposed with a pair of longitudinal guiding slots 145 so as to form the relative motion with respect to the bail 15 described later.

With reference to the figures, the number of the engage protrusion 132 is preferably to be two and the number of the corresponding engage slot 144 is also two. When at the locked position, the two engage protrusions 132 are retained with the two engage slots 144; when at the released position, the rear engage slot 144 is engaged with the front engage protrusion 132.

Figure 3:
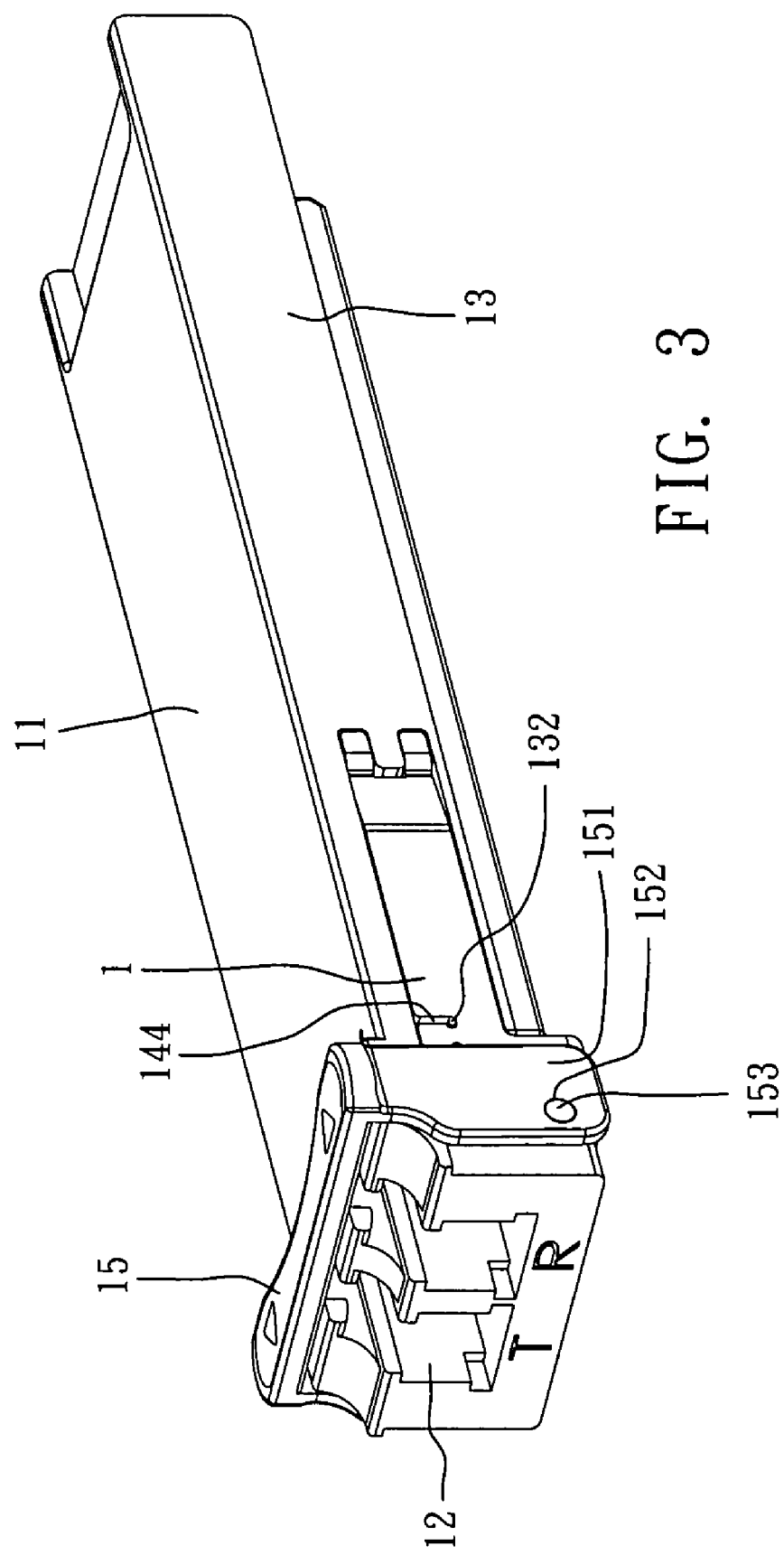
FIG. 3 is a perspective view of the transceiver module of FIG. 2 in locked state.
Figure 4:
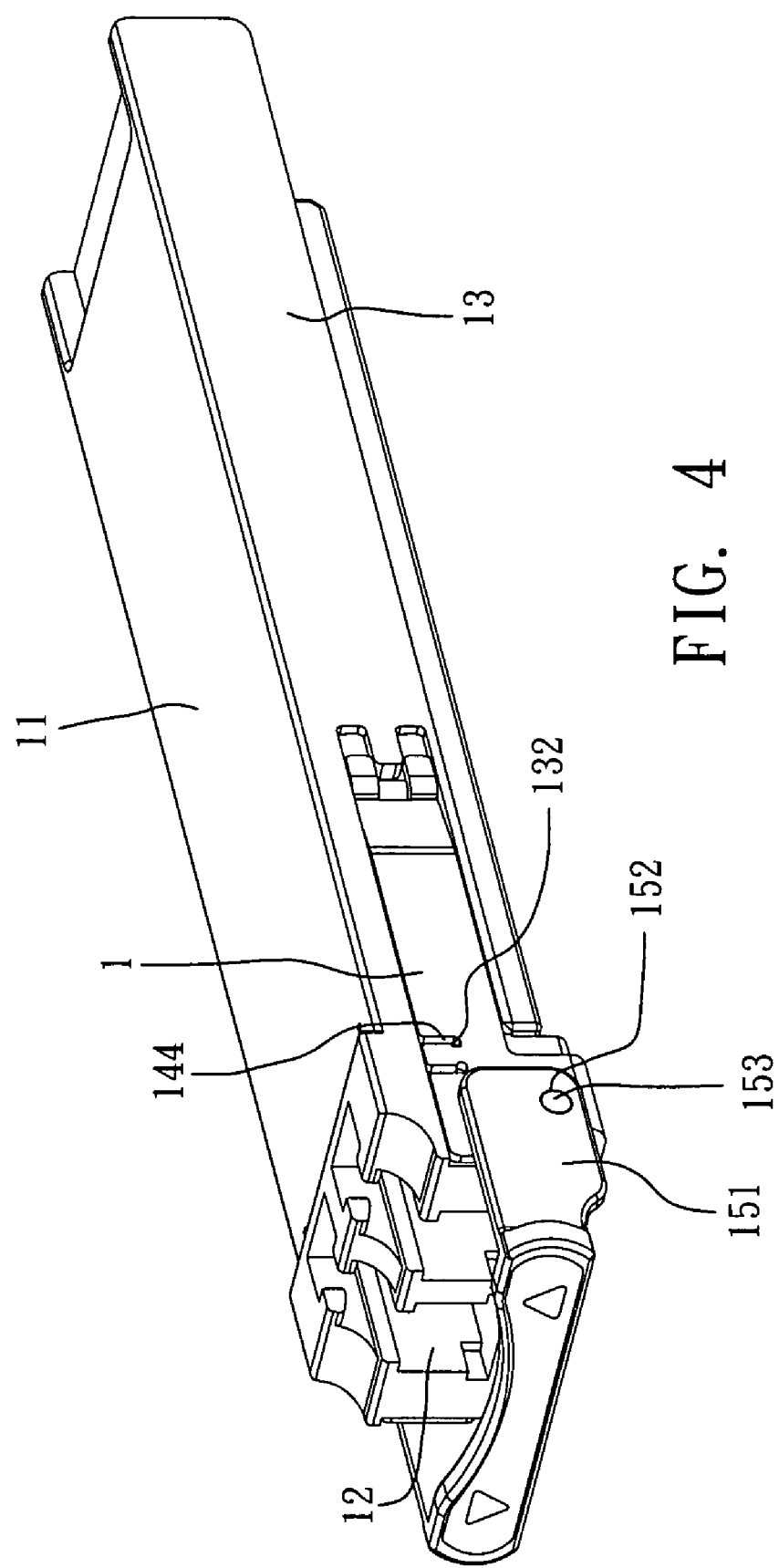
FIG. 4 is a perspective view of the transceiver module of FIG. 2 in released state.
Figure 5:
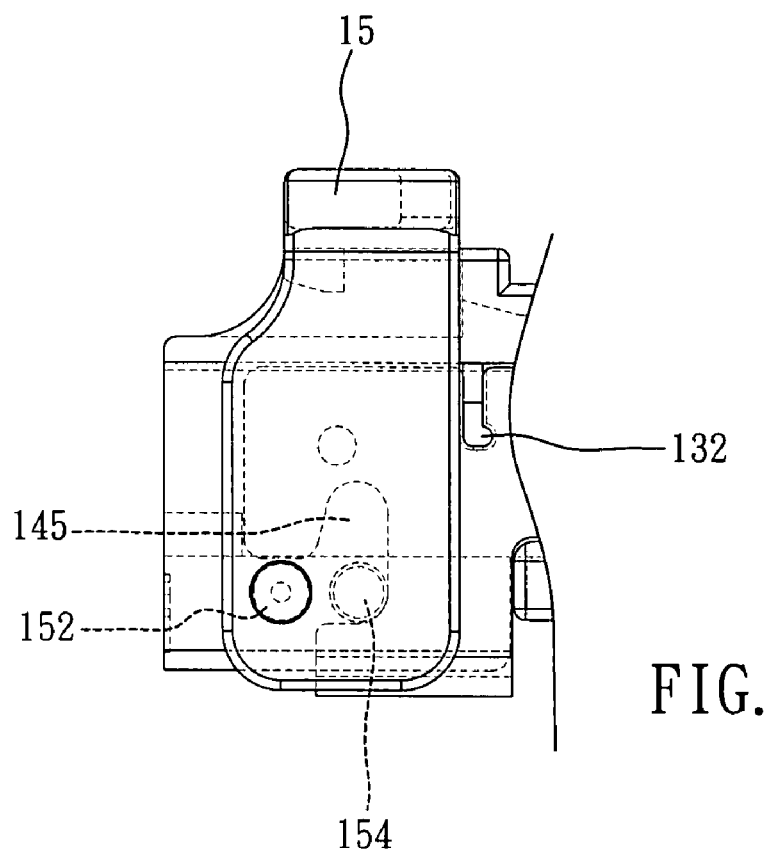
FIG. 5 is a schematic view of the relative relation between the guiding tenon and guiding slot when the bail and the handle are in the locked state.
Figure 6:
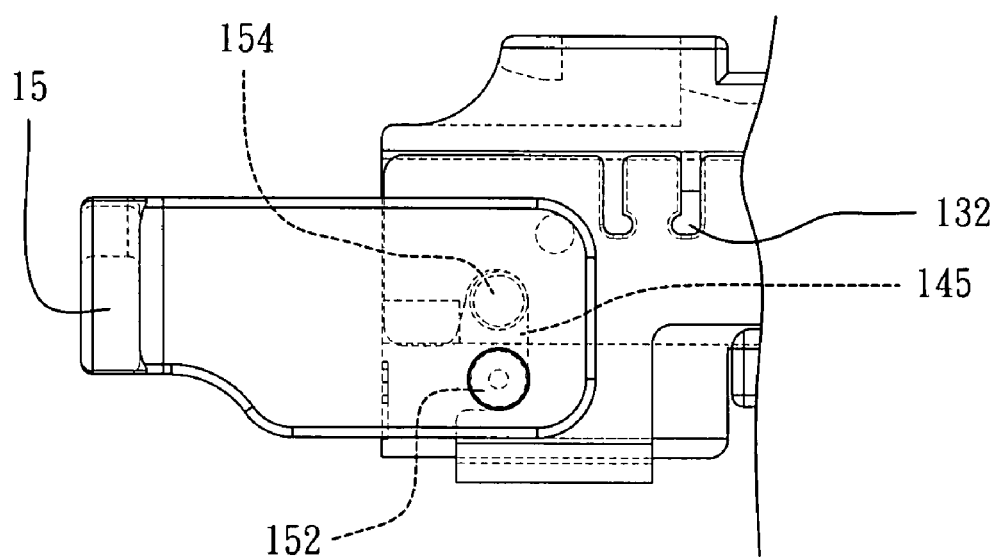
FIG. 6 is a schematic view of the relative relation between the guiding tenon and guiding slot when the bail and the handle are in the released state.
Figure 7:
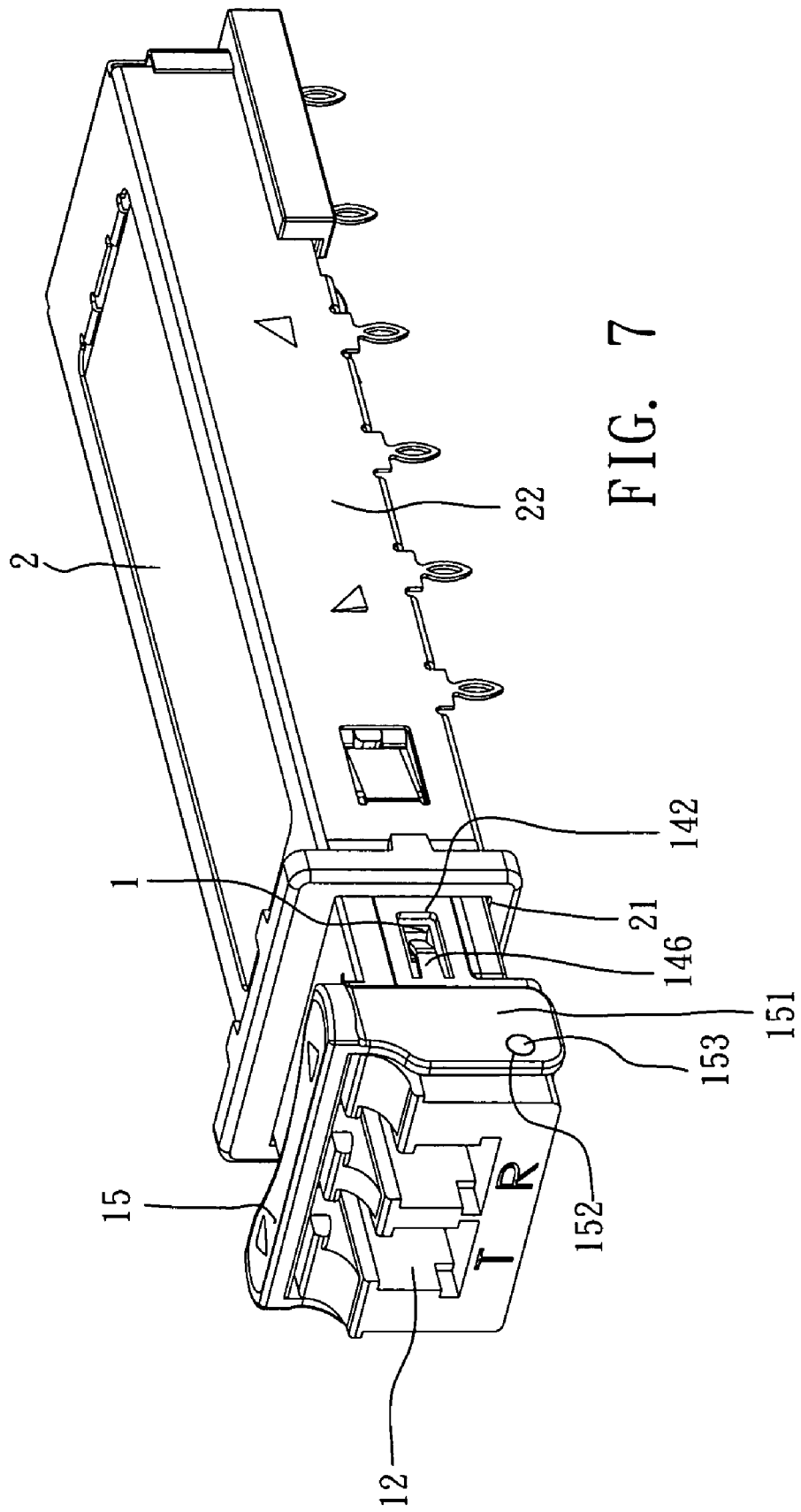
FIG. 7 is a perspective view of a fiber optical connector according to another embodiment of the present invention.

The bail 15 is a reverse U-shape frame with its two sidewalls 151 correspondingly disposed with a pair of axis hole 152 for the insertion of the a pair of axis pins 153 which is also inserted into a pair of pivotal holes 134 so as to render the bail 15 rotatable at the front of the housing 11. To synchronously drive the handle 14 in a linear motion during the rotation of the bail 15, a pair of guiding tenons 154 oppositely formed at the inner faces of the two sidewalls 151 next to the axis holes 152 are received in their respective guiding slots 145. With reference to FIGS. 3 and 5, when at the locked position, the guiding tenons 154 are positioned at the bottom ends of the guiding slots 145. To switch to the released position, the bail 15 is rotated anticlockwise such that the guiding tenons 154 drive the guiding slots 145 to move the arms 142 forward until the guiding tenons 154 are retained the top of the guiding slots 145, as shown in FIG. 6, and thus the rotation is stopped thereon. In the meantime, the wedge element 143 is flexibly compressed due to the forward motion of the arm 142 and thus released from the snap engagement of the locking tab 221, such that the transceiver module 1 is free to be pulled out of the cage assembly 2.

With reference to FIG. 1, an opening 21 is disposed at the front of the cage assembly 2 for the insertion or extraction of the transceiver module 1. To render the cage assembly 2 and the transceiver module 1 forming a locked state, a flexible locking tab 221 is disposed at the two sidewalls 22, respectively, corresponding to the wedge element 143 at the end of the slide path 131 to retain or release the wedge element 143, and thus a locked or released state can be achieved, which is a conventional art and will not be discussed here furthermore.

With reference to FIGS. 7 to 10, a fiber optical connector according to another embodiment of the present invention is disclosed, wherein the fiber optical connector comprises also a transceiver module 1 and a cage assembly 2. Most components of the present embodiment are identical to those of the previous embodiment, and the components are identified with the same designations and numbers. The difference between the second embodiment and the first embodiment lies in the fact that the means of engagement for locating the handle 14 and housing 11.

Figure 8:
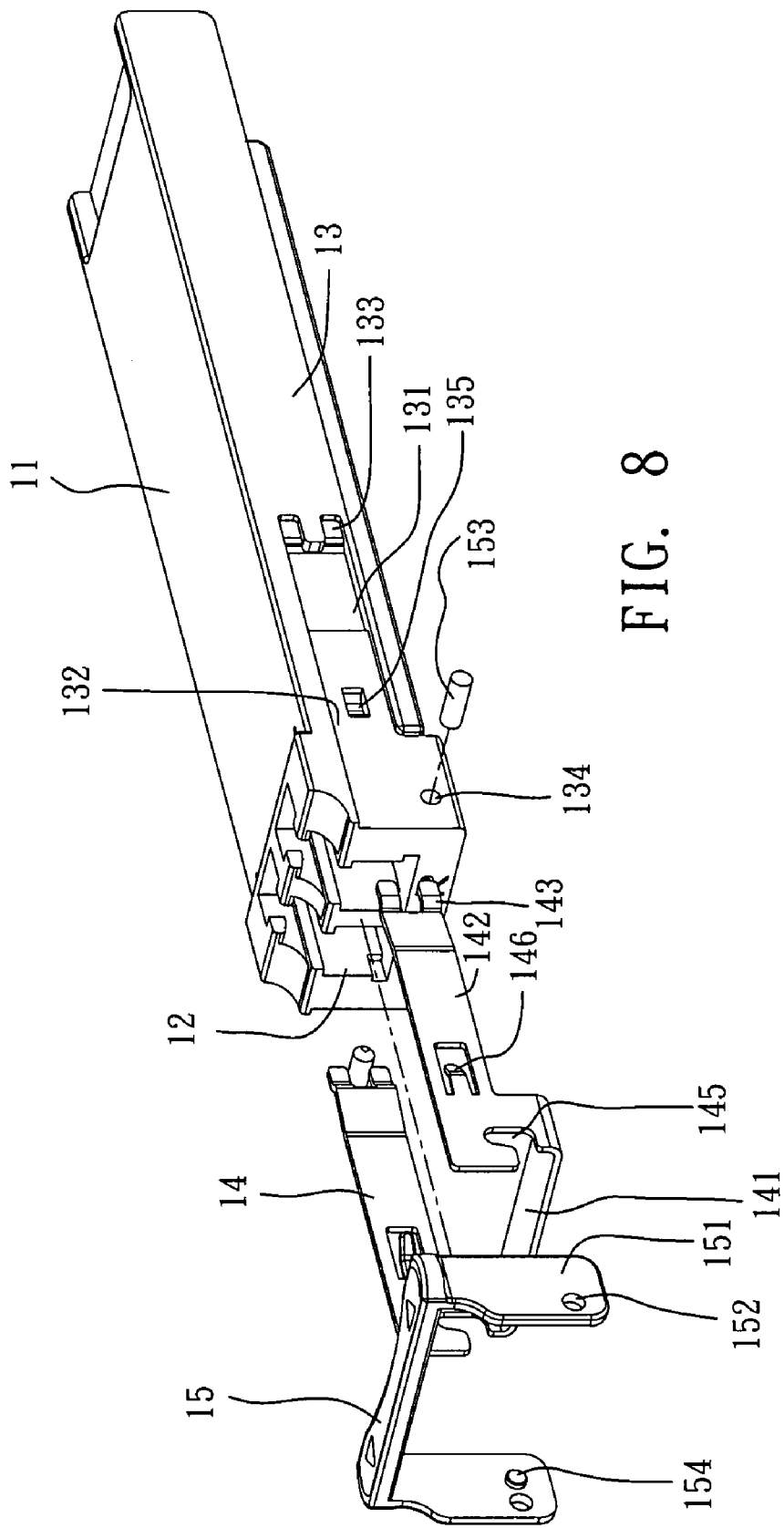
FIG. 8 is an exploded view of a transceiver module according to another embodiment of the present invention.
Figure 9:
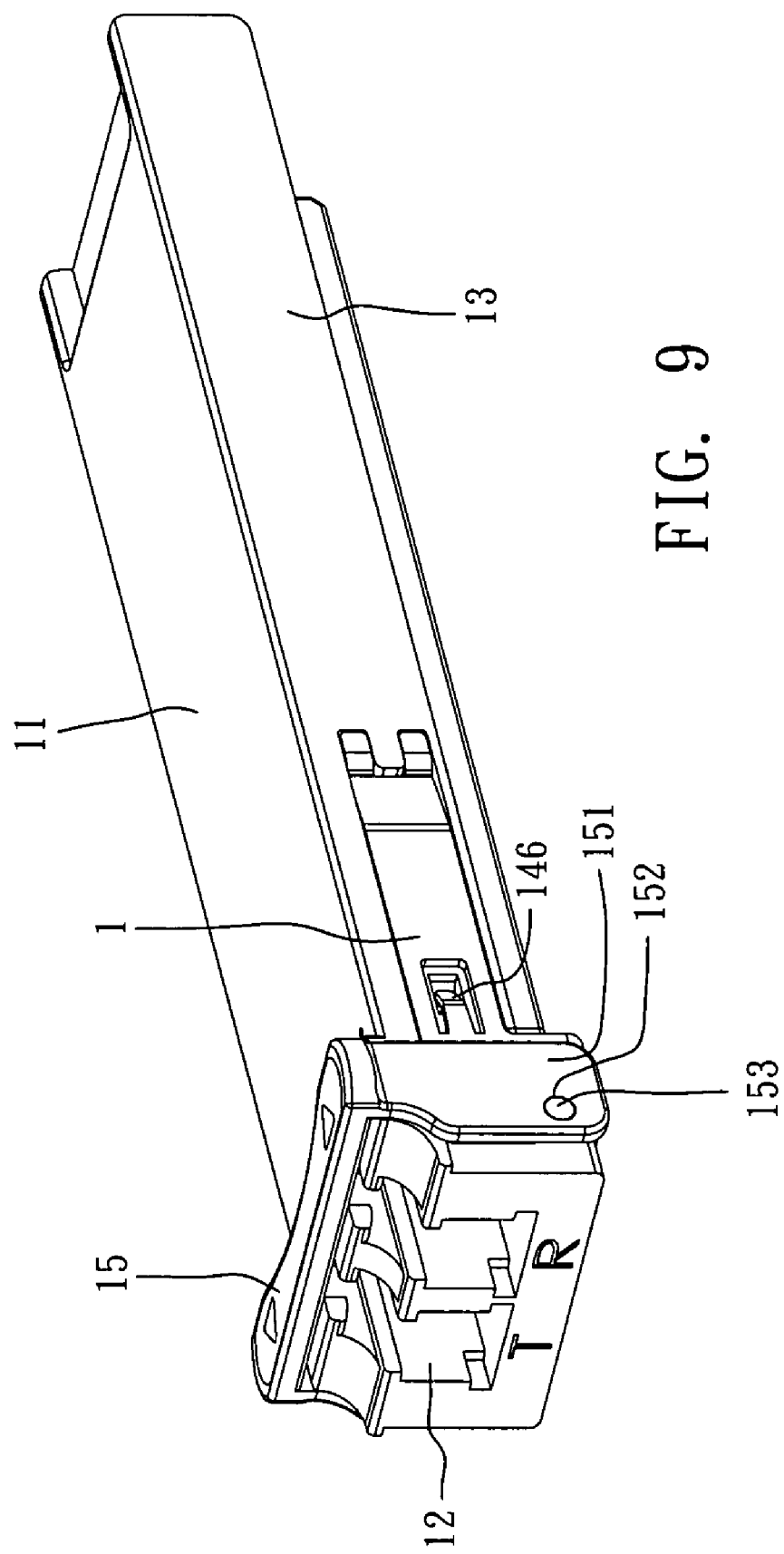
FIG. 9 is a perspective view of the transceiver module of FIG. 8 in locked state.

With reference to FIG. 8, a pair of flexible tabs 146 are inward formed at the two opposite arms 142, and a pair of retain slots 135 are recessively formed at the two opposite slide paths 131 corresponding to the flexible tabs 146. When at the locked position, the flexible tabs 146 are snappingly engaged at the retain slots 135 (as shown in FIG. 9). In the meantime, the wedge elements 143 formed at the end of the arms 142 are positioned at the protruded segments 133 at the end of the slide paths 131, and the edges of the locking tabs 221 of the sidewalls 22 of the cage assembly 2 retain the wedge elements 143, such that the transceiver module 1 is retracted and received in the cage assembly 2.

Figure 10:
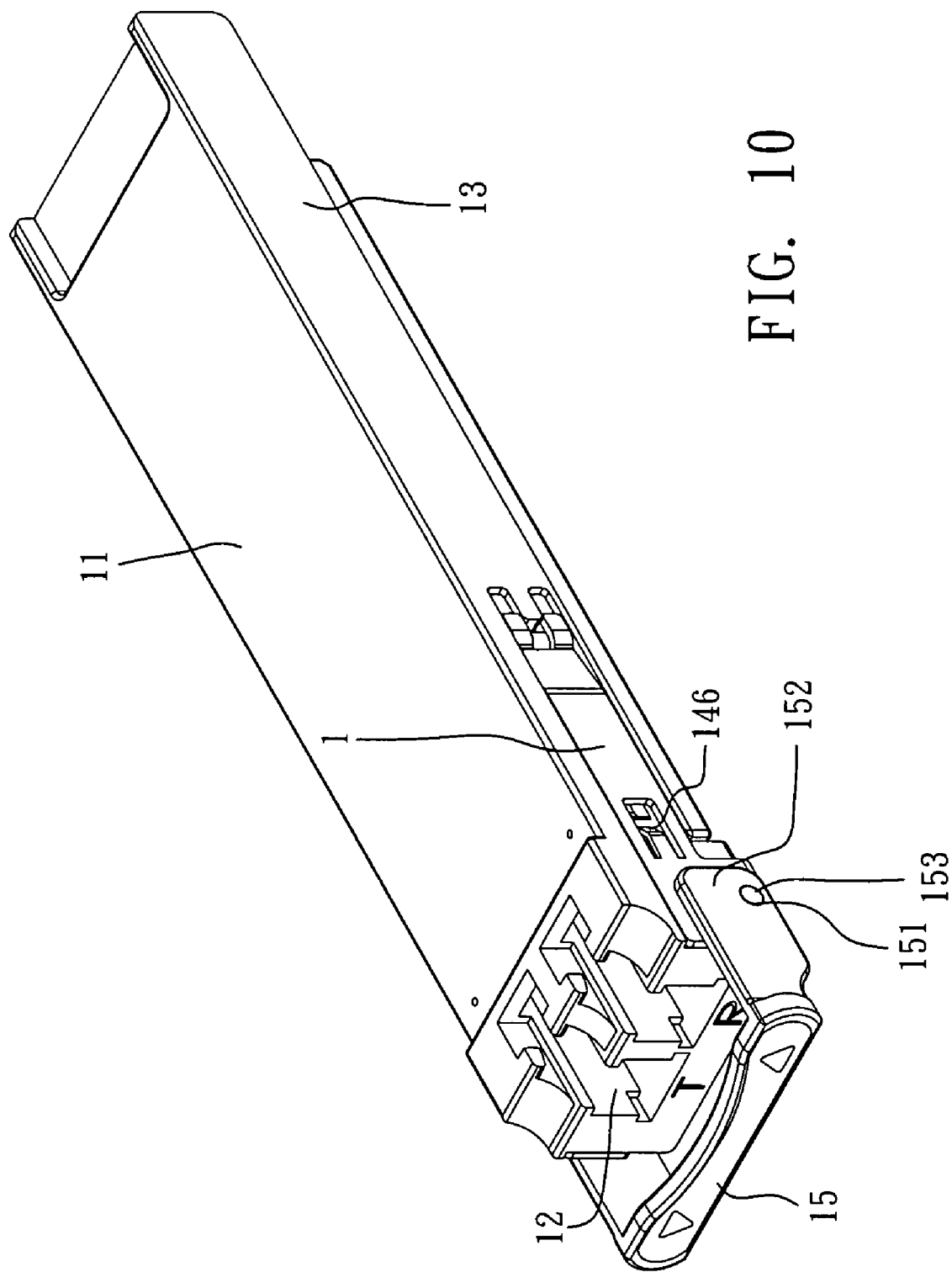
FIG. 10 is an exploded view of the transceiver module of FIG. 8 in released state.

To release from the locked state, the bail 15 is pushed forward to rotate and drive the pair of the guiding tenons 154 during the rotation to push the pair of the guiding slots 145. The arms 142, in turn, are urged to move forward until the guiding tenons 154 are retained at the top of the guiding slot 145 to prevent the bail 15 from rotating; in the meantime, the pair of the wedge elements 143 and the flexible tabs 146 are released from the snap engagement of the locking tabs 221 and retain slot 135 (as shown in FIG. 10) as a result of the forward motion of the arms 142. Consequently, the transceiver module 1 can be pulled out of the opening of the cage assembly 2.

Figure 11:
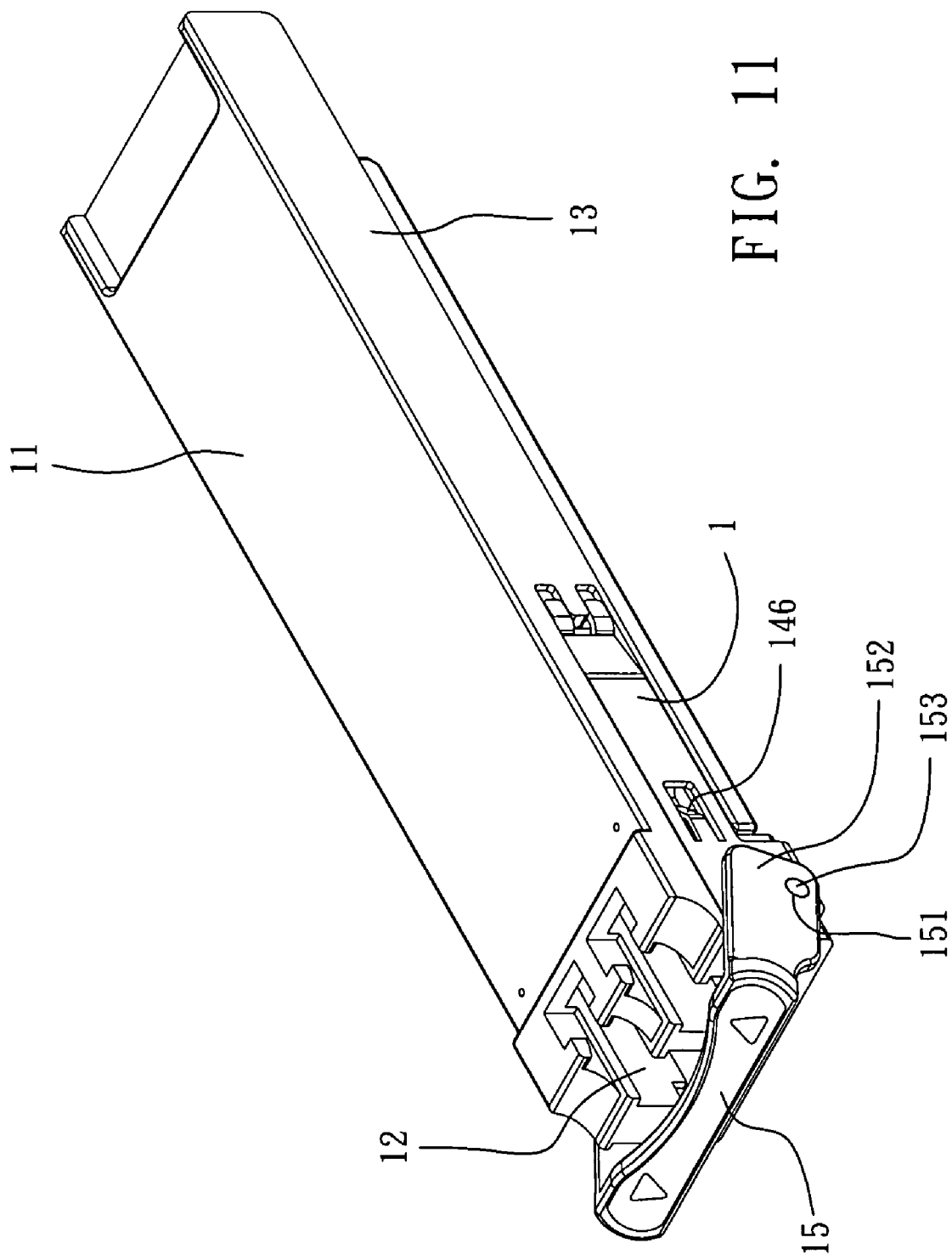
FIG. 11 is a perspective view of the automatic return of the bail of the transceiver module of FIG. 8.
Figure 12:
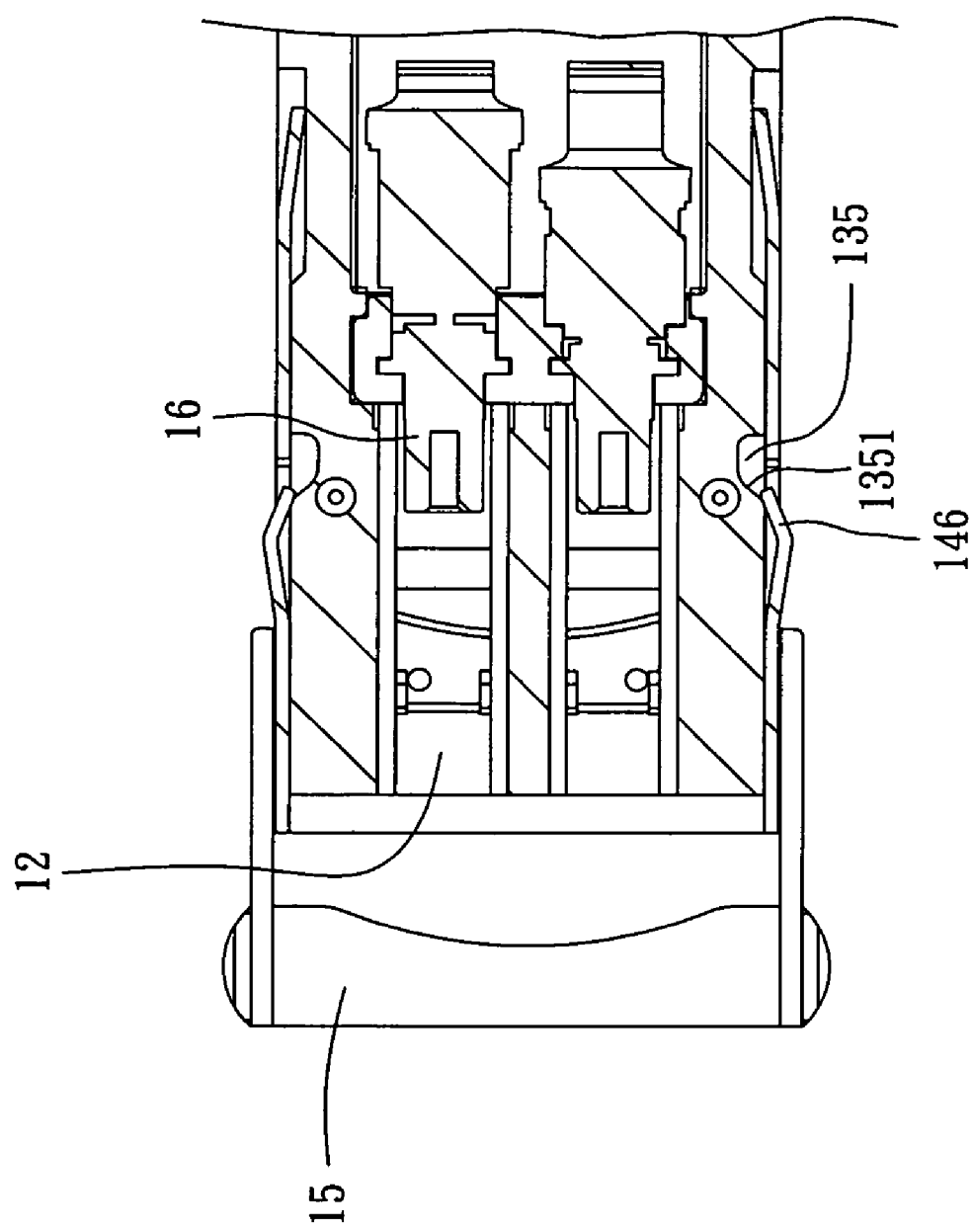
FIG. 12 is a cross-section view of the automatic return of the bail of FIG. 8.

With reference to FIGS. 11 and 12, when the transceiver module 1 is to be inserted again into the cage assembly 2, the bail 15 is pulled in reverse direction to drive the pair of guiding tenons 154 to move reversely on the pair of guiding slots 145 and in turn the arm 142 are urged to move backward. When the flexible tabs 146 move to the tapered faces 1351 of the retain slots 135, the movable ends of the flexible tabs 146, due to their flexibility, move along the tapered faces 1351 and are retained at the retain slots 135, such that the bail 15 returns automatically to the locked position and also the pair of the wedge elements 143 are received in the protruded segments 133 at the ends of the slide paths 131. Finally, the transceiver module 1 is inserted into the cage assembly 2 to retain the pair of corresponding locking tabs 221 of the two sidewalls 22 at the wedge elements 143, such that the transceiver module 1 is integrated into the cage assembly 2.

Consequently, with the implementation of the present invention, the handle of the present invention is only disposed with a longitudinal guiding slot, without an eccentric cam slot and a straight second slot required in the U.S. Pat. No. 6,872,020 B1, to render the handle move in a linear motion with the rotation of the bail; the number of component is therefore cut down. Further, instead of the locating engagement of a slot and a boss provided at the rotating path of the bail and the handle in the U.S. Patent described above, the present invention provides a locating structure, the engage slots and the engage protrusions in the first embodiment or the flexible tabs and the retain slots in the second embodiment, for example, correspondingly disposed at the arms and the slide paths. The fiber optical connector is indeed a breakthrough of its kind.

The present invention provides a feasible solution, and a patent application is duly filed accordingly. However, it is to be noted that the preferred embodiments disclosed in the specification and the accompanying drawings are not intended to limit the invention. To the contrary, it is intended to cover various modifications and similar arrangements and procedures, and thus the scope of the appended claims should be accorded the broadest interpretation so as to encompass all such modifications and similar arrangements and procedures.

What is claimed is:

1. A fiber optical connector release mechanism in combination with a transceiver module housed in a cage assembly, comprising:

a transceiver module which is a housing disposed with relevant circuits and a pair of LC plugs mounted at the two front openings and whose two sidewalls are disposed with a slide path, respectively, which is protruded to form at least an engage protrusion;

a handle whose bottom is connected through a connection plate to a pair of arms extending rearward which are formed to have engage slots corresponding to the engage protrusions, to have a pair of longitudinal guiding slots at the front end, and to have flexible wedge elements at the rear end, wherein the wedge elements are positioned at the protruded segments at the end of the slide paths;

a bail whose two sidewalls are pivotally connected to the front of the two sidewalls of the housing and which is protrudingly disposed with a pair of guiding tenons to be received in their respective guiding slots;

a cage assembly whose front is disposed with an opening and two sidewalls are disposed with a flexible locking tab corresponding to the wedge elements; such that, when at the locked state, the engage slot on the arm is retained at the engage protrusion at the slide path to render the bail at the locked position; and further, when the bail is rotated such that the guiding tenons drive the guiding slots to move the arms forward and the wedge elements and the engage slots released from the snap engagement of the locking tabs and engage protrusions due to the forward motion of the arms, such that the transceiver module is free to be pulled out of the cage assembly.

2. The fiber optical connector release mechanism as claimed in claim 1, wherein the wedge element is in a shape of fork and the protruded segment the end of the slide path is also a shape of fork.

3. The fiber optical connector release mechanism as claimed in claim 1, wherein there are two engage protrusions and two engage slots, and when at the locked position, the two engage protrusions are retained with the two engage slots and when at the released position, the rear engage slot is engaged with the front engage protrusion.

4. The fiber optical connector release mechanism as claimed in claim 1, wherein the pivotal connection between the housing and the bail is achieved by inserting two axis pins into the corresponding axis holes on the bail and then onto the correspondingly formed pivotal holes at the front of the housing for fixed mounting.

* * * * *